Aug. 7, 1962
L. BALAMUTH ET AL
3,047,955
AMPLITUDE INDICATORS
Filed Aug. 15, 1960
2 Sheets-Sheet 1
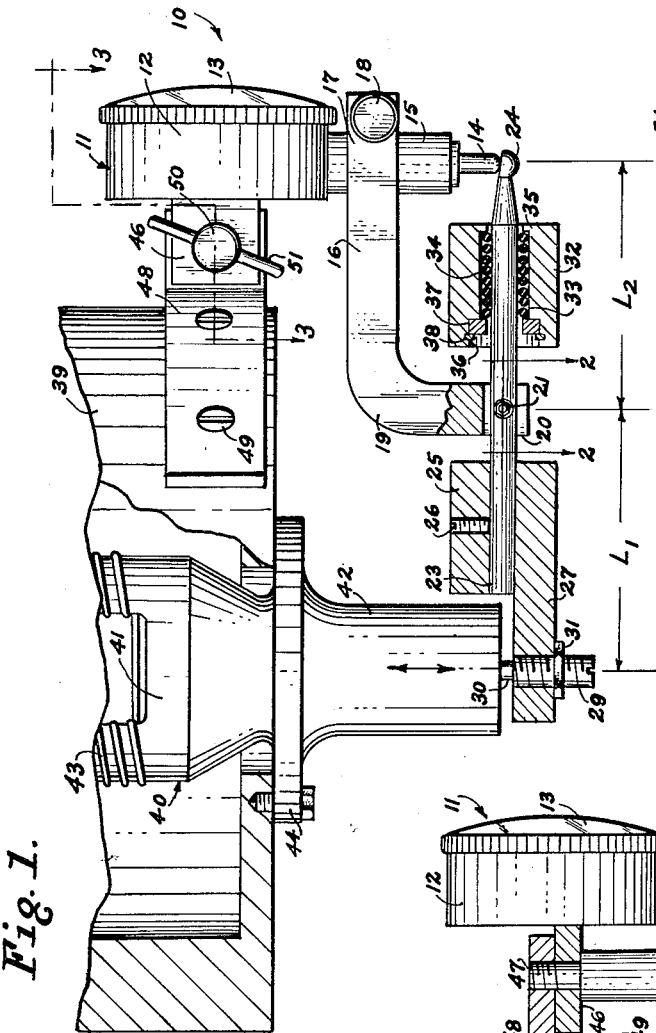
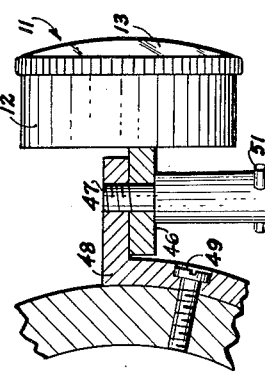
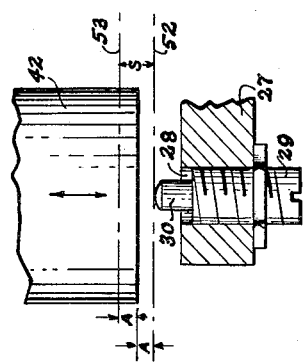
INVENTOR.
LEWIS BALAMUTH &
CLAUS KLEESATTEL
BY
ATTORNEY.

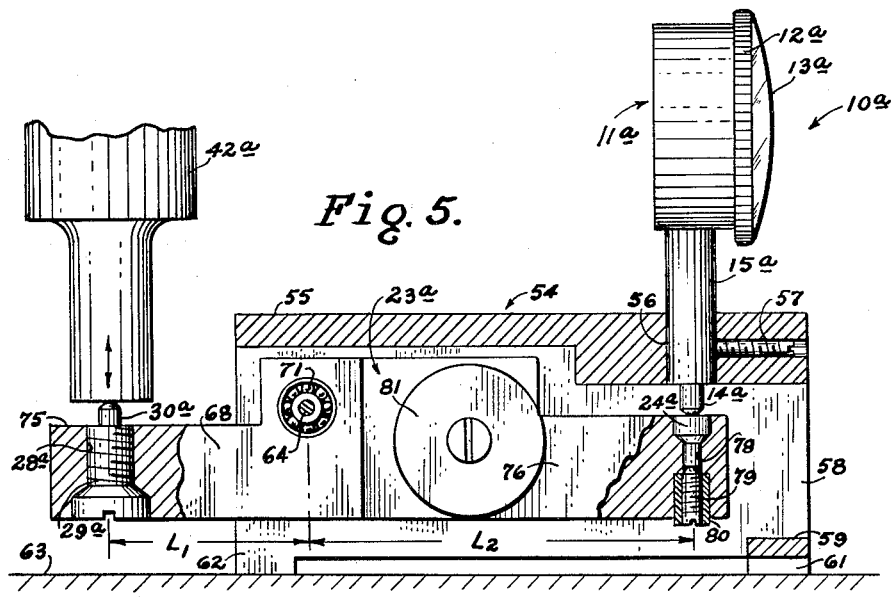
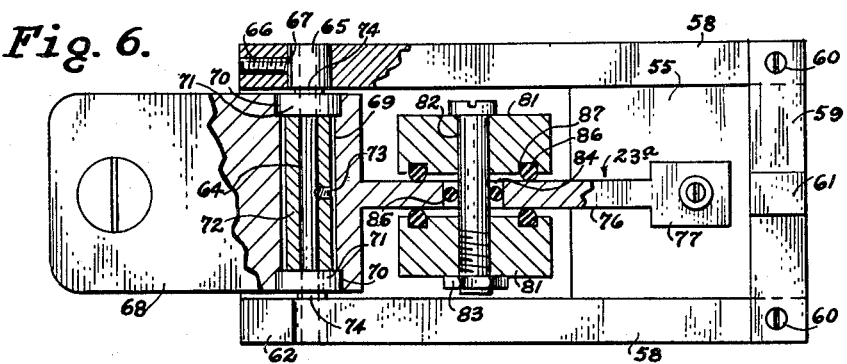

United States Patent Office 3,047,955
Patented Aug. 7, 1962

3,047,955
AMPLITUDE INDICATORS
Lewis Balamuth, New York, and Claus Kleesattel, Forest Hills, N.Y., assignors to Cavitron Ultrasonics Inc., Long Island City, N.Y., a corporation of New York
Filed Aug. 15, 1960, Ser. No. 49,504
9 Claims. (Cl. 33—172)

This invention relates generally to amplitude indicators, and more particularly is directed to mechanical devices for indicating the amplitude of high frequency vibrations.

With the increasing use of high frequency, for example, one thousand cycles per second or more, or even ultrasonic vibrations in performing various operations, for example, in machining or forming metals, welding or soldering, and cleaning grinding wheels, filters or the like, to mention but a few of the present applications of high frequency vibrations, it has become important to provide means by which the amplitude of the vibrations may be conveniently and accurately determined, particularly since the effectiveness of the high frequency vibrations in performing the particular operation is substantially dependent upon the maintenance of an optimum amplitude and frequency. Although various electrical instruments have been developed for indicating the amplitude of high frequency vibrations, for example, instruments employing magnetostrictive or piezo-electric pickups, such instruments have to be initially calibrated in a reliable manner and further have the tendency to lose their accuracy, for example, by reason of aging of the electronic tubes employed therein. Thus, the need exists for a mechanical instrument capable of reliably indicating the amplitude of high frequency vibrations either for use in the calibration of electrical amplitude indicators employed in connection with high frequency vibration equipment or for use in directly checking the amplitude of the high frequency vibrations produced by such equipment.

It is an object of the present invention to provide mechanical amplitude indicators for high frequency vibrations which are relatively simple and inexpensive in construction and easily maintained so as to ensure the reliable and accurate operation thereof.

Another object is to provide mechanical amplitude indicators which employ a conventional dial indicator for visually indicating the amplitude of a high frequency vibration, and wherein an arrangement is provided for ensuring the steady and vibration-free indication of the sensed amplitude by the pointer of such dial indicator.

In accordance with an aspect of this invention, a mechanical amplitude indicator includes a lever pivoted to swing about a fixed axis and engageable with the member which is vibrated at a high frequency and also with the actuating stem or plunger of a conventional dial indicator having its housing fixed relative to the stationary pivoting axis of the lever, and the lever is provided with a sufficient inertia so that it will be continuously angularly displaced to an extent determined by the amplitude of the sensed vibrations, but will not follow the vibrating movement, thereby to provide a steady reading of the pointer of the dial indicator.

In accordance with another aspect of the invention, the pivoted lever is further preferably provided with dampening means effective to prevent flexural movements of the lever by reason of the intermittent engagement of the latter with the member vibrated at a high frequency, thereby to further ensure a steady reading of the dial indicator.

In one embodiment of the present invention, the housing of the dial indicator and the structure defining the pivoting axis of the lever are securely fixed to a stationary part of the high frequency vibrating machine, for example, to the stationary housing or casing of a magnetostrictive transducer employed for generating the high frequency, acoustic or ultrasonic vibrations of a tool holder or the like, while in another embodiment of the invention, the housing of the dial indicator and the structure defining the pivoting axis of the lever are mounted on a frame which can be conveniently placed on a table or other fixed structure of the high frequency vibration machine so as to dispose an end of the lever under the tool, tool holder or other part of the machine which is vibrated at a high frequency.

The above, and other objects, features and advantages of the invention, will be apparent in the following detailed description of illustrative embodiments of the invention which is to be read in connection with the accompanying drawings forming a part hereof, and wherein:

FIG. 1 is a side elevational view, partly broken away and in section, of a mechanical amplitude indicator embodying the present invention, and which is shown assembled in its operating position on a machine having a part or member which is vibrated at a high frequency;

FIG. 2 is a fragmentary, detail sectional view taken along the line 2—2 of FIG. 1;

FIG. 3 is a fragmentary detail sectional view taken along the line 3—3 of FIG. 1;

FIG. 4 is a fragmentary enlargement of a portion of FIG. 1 illustrating the condition of the amplitude indicator embodying the present invention during the operation thereof;

FIG. 5 is a side elevational view, partly broken away and in section, of a mechanical amplitude indicator constructed in accordance with another embodiment of the present invention; and FIG. 6 is a bottom plan view, partly broken away and in section, of the amplitude indicator shown in FIG. 5.

Referring to the drawings in detail, and initially to FIG. 1 thereof, it will be seen that a mechanical amplitude indicator constructed in accordance with one embodiment of the present invention, and there generally identified by the reference numeral 10, includes a commercially available dial indicator 11, for example, a dial indicator of the kind available under the designation PII from the Federal Instrument Corporation, and which has a housing 12 containing a suitable mechanical system by which a rotatable pointer visible through a cover glass 13 of the housing is displaced along a suitably calibrated scale (not shown) in response to the linear displacement of an actuating stem or plunger 14 projecting axially from a tubular extension 15 provided on the housing of the dial indicator.

A support arm 16 is formed, at one end, with a split clamp 17 embracing the tubular extension 15 of the dial indicator housing and has a clamping screw 18 extending across the split clamp so that the latter may be securely tightened on extension 15 for rigidly securing support arm 16 relative to dial indicator housing 12. The opposite end portion of support arm 16 is bent downwardly, as at 19, and terminates in a bifurcated or forked end 20. Each of the separated or spaced parts of forked end 20 has a pivot screw 21 extending adjustably therethrough and formed with a pointed inner end (FIG. 2), and a lock nut 22 is threaded on each pivot screw 21 for holding the latter against inadvertent turning relative to the forked end 20 of support arm 16.

A lever 23 has aligned conical recesses formed in the opposite sides thereof at a location intermediate the ends of the lever, and extends loosely through the forked end 20 of support arm 16 with the pivot screws 21 being adjusted to engage their pointed inner ends in the conical recesses of lever 23, thereby to provide relatively low friction, needle-type bearings for pivotally suspending lever 23 from support arm 16.

Lever 23 is longitudinally dimensioned so that one end thereof extends under actuating stem 14, and that end of lever 23 is formed with a contact piece 24 engageable upwardly against the lower end of actuating stem 14. The opposite end portion of lever 23 has a weight or mass defining member 25 secured thereto, as by a set screw 26, and the weight 25 is formed with an extension or ledge 27. Ledge 27 has a tapped hole 28 extending therethrough to threadably receive an adjustable contact member 29 in the form of a screw having a reduced diameter, rounded head 30 at its upper end. A lock nut 31 is threaded on screw 29 to engage against the bottom of ledge 27 and thereby prevent inadvertent turning of contact screw 29.

The lever 23 further carries a weight or mass defining member 32 at a location intermediate the pivoting axis of the lever and contact piece 24. Weight 32 is in the form of a relatively massive cylinder having an axially extending bore 33 (FIG. 1) of greater diameter than the lever 23 so as to define an annular clearance or space therebetween which snugly receives an axially arranged series of rubber O-rings 34. Weight 32 is further formed with a radial, inwardly directed flange 35 disposed at one end of bore 33 and having a substantial radial clearance with respect to lever 23, while the opposite end of bore 33 is counterbored, as at 36, to receive a retaining ring 37 which also has a substantial radial clearance with respect to lever 23 and which is held within counterbore 36 by means of a snap ring 38 fitting in a circumferential groove in counterbore 36. Thus, the only contact between lever 23 and weight 32 is by means of the axially arranged series of rubber rings 34.

The mechanical amplitude indicator 10 is intended to be mounted on a fixed part of the vibration generating machine, for example, on the stationary housing or casing 39 of a vibrator unit 40 having the usual magnetostrictive transducer section 41 rigidly fixed to one end of a connecting body or tool holder 42 and having a winding 43 in surrounding relation to the transducer section 41 to generate longitudinal vibrations in the latter in response to the establishment of an alternating magnetic field by passage of a biased alternating current through winding 43. The vibrations of transducer section 41 are transmitted through connecting body 42 to effect vibrations in the longitudinal direction, as indicated by the arrows on FIG. 1, at the lower end surface of the connecting body which may carry a vibrated tool or the like. The vibrator unit 40 may be connected to fixed housing or casing 39 at a node of motion of connecting body 42, for example, by a flange 44 through which screws extend into tapped holes in an end wall of housing 39.

In order to permit the mechanical amplitude indicator 10 to indicate the amplitude of the vibrations at the lower end surface of connecting body or tool holder 42, the housing 12 of dial indicator 11 is provided with a mounting lug 46 extending from the back thereof (FIGS. 1 and 3) and formed with a hole extending therethrough to receive the shank of a screw 47 which is threaded into a tapped hole formed in a mounting bracket 48 secured to housing 39, as by screws 49. The screw 47 is preferably formed with an elongated head 50 having a diametrical handle 51 to facilitate the manual tightening and loosening of screw 47 during the mounting or removal of the amplitude indicating device 10.

The several described parts of amplitude indicating device 10 are dimensioned so that, when housing 12 of dial indicator 11 is securely attached to mounting bracket 48, as in FIG. 1 of the drawing, ledge 27 of weight 25 extends under the operative lower end of connecting body 42 with the head 30 of contact screw 29 being engageable with the lower end surface of connecting body 42. The contact screw 29 is initially adjusted vertically with respect to ledge 27 so that, when the vibrator unit 40 is inoperative, at which time the lower end surface of connecting body 42 is at the center of its oscillatory path, head 30 of screw 29 engages the lower end surface of connecting body 42 with the pointer of dial indicator 11 showing a zero indication.

When the vibrator unit 40 is operated by the passage of a biased alternating current through winding 43, the lower end surface of connecting body 42 vibrates vertically between the extreme lower and upper positions represented by the lines 52 and 53 on FIG. 4 and which are respectively equally below and above the rest position of the bottom surface of connecting body 42, represented in full lines on FIG. 4, by a distance A which is the amplitude of the vibration. The amplitude A of the vibrations is equal to one-half the total excursion or stroke S of the lower operative end of connecting body 42.

It is apparent that, if head 30 of contact screw 29 is in contact with the lower end surface of connecting body 42 in the rest position of the latter and the pointer of dial indicator 11 then gives a zero indication, the movement of the lower end surface of connecting body 42 down to its lower extreme position 52 correspondingly displaces head 30 of contact screw 29, thereby to cause pivoting of lever 23 in the counterclockwise direction, as viewed in FIG. 1, so that the contact piece 24 of lever 23 is correspondingly upwardly displaced to raise actuating stem 14 of the dial indicator, whereby the pointer of the dial indicator moves across the associated scale to indicate the amplitude A of the vibration. Although the pointer of the conventional dial indicator 11 tends to return to its zero indication, so that the head 30 of contact screw 29 would tend to follow the movement of the lower end surface of connecting body 42 from its lower extreme position 52 toward its upper extreme position 53, thereby imparting an oscillating or vibrating movement to the pointer of dial indicator 11 in response to vibration of the lower end surface of connecting body 42, the weights 25 and 32 provided on the lever 23 of the amplitude indicator 10 embodying the present invention ensure that the lever 23 has a sufficient inertia so that the latter will not oscillate in accordance with the high frequency, for example, 1000 cycles per second or more, vertical vibrations of the lower end of connecting body 42, but rather will remain in the angularly displaced position corresponding to the extreme lower position 52 of the bottom surface of the connecting body. Stated in another way, the inertia of lever 23 is sufficiently high so that the time required to commence the angular displacement of lever 23 in the clockwise direction, as viewed in FIG. 1, from the position thereof corresponding to the extreme lower position 52 of the bottom surface of connecting body 42 exceeds the time required for one vibrating cycle of connecting body 42, that is, the time required for movement of the lower surface of body 42 from its extreme lower position 52 up to its extreme upper position 53 and back to the extreme lower position 52, which time is less than .001 second for the high frequencies indicated above.

Thus, during operation of vibrator unit 40, the lower surface of connecting body 42 intermittently contacts the head 30 of contact screw 29, and there is the possibility that such intermittent contact would give rise to a flexural vibration or movement along the lever 23 even though the latter does not turn about its pivoting axis. However, in accordance with the present invention, the rubber rings 34 supporting weight 32 on lever 23 provide damping means for avoiding the transmission of such flexural vibrations along lever 23 to the contact piece 24 engaging the actuating stem 14 of dial indicator 11. Thus, the pointer of dial indicator 11 is vibration-free and remains steadily at an angularly displaced position corresponding to the amplitude A of the sensed vibration.

When the distance $L_1$ from the center of head 30 of contact screw 29 to the pivoting axis of lever 23 is equal to the distance $L_2$ from the pivoting axis to the point of contact of actuating stem 14 with contact piece 24, the linear displacement of actuating stem 14 is equal to the displacement of head 30 by the vibration of the lower end surface of connecting body 42, that is, equal to the amplitude A of the vibrations, so that the pointer of dial indicator 11 cooperates with the associated scale to provide a direct reading of the amplitude. However, if the distance $L_1$ is equal to one-half the distance $L_2$, then the displacement of actuating stem 14 is equal to twice the displacement of the head 30 of contact screw 29, so that the pointer of dial indicator 11 then gives a direct reading of the total excursion or stroke of the sensed vibrations.

Although the amplitude indicator 10 embodying the invention is securely attached to a part of the vibrating machine, more specifically, to the stationary housing 39 of the vibrator unit 40, it is to be noted that amplitude indicators embodying the invention can be designed so as to be merely placed in operative position on the vibrating machine for sensing the amplitude of the vibrations of a part thereof, without requiring the manipulation of any securing elements, such as, the securing bolt or screw 47 of the indicator 10. For example, in FIGS. 5 and 6, there is illustrated a mechanical amplitude indicator generally identified by the reference numeral 10a which also includes a conventional dial indicator 11a having a housing or casing 12a containing a suitable mechanism by which a pointer visible through a cover glass 13a is made to turn across a suitably calibrated scale in response to the linear displacements of an actuating stem or plunger 14a projecting from a tubular extension 15a of the housing 12a.

The dial indicator 11a is mounted on a frame 54 having a top wall 55 formed with a hole 56 extending therethrough adjacent one end and in which extension 15a of the dial indicator housing is secured, for example, by means of a set screw 57. Frame 54 further includes side walls 58 depending from the opposite longitudinal edges of top wall 55, and a cross-member 59 extending between the lower edges of side walls 58 and secured to the latter, as by screws 60, at the end of the frame carrying dial indicator 11a. Cross-member 59 has a central depending foot 61 which cooperates with similar depending feet 62 formed at the ends of side walls 58 remote from cross-member 59 to provide a stable three-point or tripod support for the frame 54 on a workpiece supporting table 63 or the like of the vibrating machine.

The amplitude indicator 10a of FIGS. 5 and 6 further includes a lever 23a which is pivotally mounted, intermediate its opposite ends, in the frame 54, and which is longitudinally dimensioned so that one end of lever 23a extends under the actuating stem or plunger 14a of dial indicator 11a to effect upward displacements of the actuating stem in response to counter-clockwise angular movement of the lever, while the other end of lever 23a projects out of the housing 54, at the end of the latter remote from the dial indicator, and is adapted to be positioned under the vibrating lower end surface of a connecting body, tool holder or the like, indicated at 42a so as to cause a corresponding angular displacement of lever 23a in the counter-clockwise direction in response to the vibrations.

In amplitude indicator 10a, the pivotal mounting for lever 23a includes an axle 64 extending laterally between side walls 58 of the frame and having its opposite ends received in bushings 65 which are secured, as by set screws 66, in laterally aligned holes 67 formed in side walls 58 adjacent the end of frame 54 remote from dial indicator 11a. Lever 23a is formed with a laterally enlarged, massive portion 68 having a bore 69 extending laterally therethrough and formed with counterbores 70 at its opposite ends. Roller or other suitable antifriction bearings 71 have their outer races received in the counterbores 70, while the inner races of bearings 71 are mounted on axle 64 with a tubular spacer 72 being secured on axle 64, as by a set screw 73, between the bearings 71, and with a washer 74 being disposed between the inner race of each bearing 71 and the adjacent bushing 65 (FIG. 6) in order to ensure a proper lateral clearance between the massive portion 68 of lever 23a and side walls 58 of the frame.

The laterally enlarged, massive portion 68 of lever 23a is downwardly stepped to define a ledge surface 75 (FIG. 5) adapted to extend under the vibrating part 42a and is formed with a tapped vertical hole 28a which receives a contact screw 29a having a rounded head 30a engageable with the vertically vibrating lower end surface of connecting body or tool holder 42a.

The arm 76 of lever 23a extending from the pivoting axis under actuating stem 14a of the dial indicator is relatively narrow for most of its length (FIG. 6) and terminates in a laterally enlarged end portion 77 which is formed with a vertical bore 78 extending therethrough and having a countersunk upper part that slidably receives a hardened insert 24a forming a contact piece for engagement with the actuating stem 14a. The contact piece 24a is vertically movable within bore 78 by an adjusting screw 79 which is threaded into a tapped bushing 80 having a press fit in the lower part of bore 78 so that the hardened contact piece 24a may be adjusted relative to lever 23a to provide a zero indication of the pointer of dial indicator 11a when the head 30a of contact screw 29a is engaged with the lower end surface of connecting body 42a in the rest condition of the latter, that is, when such lower end surface is not being vibrated.

The amplitude indicator 10a further has weights or mass defining members 81 mounted on arm 76 at opposite sides of the latter to cooperate with the massive portion 68 of the lever in providing the latter with sufficient inertia so that the lever will not be oscillated in response to the vibration of the lower end of connecting body 42a engageable with head 30a of contact screw 29a, but rather will assume an angularly displaced position in which the surface of head 30a is at the level of the lower end surface of the connecting body at the lower limits of the vibrating stroke thereof. Further, the weights 81 are mounted on arm 76 of lever 23a in a manner to define a damping means for avoiding the transmission of flexural movements or vibrations along the lever from the intermittently contacted head 30a to the contact piece 24a in engagement with atcuating stem 14a. As shown in FIG. 6, the mounting for the weights 81 on arm 76 may include a bolt 82 extending through central holes in the weights 81, which are in the form of disks, and through a relatively large hole 83 in arm 76, and a nut 83 screwed on the bolt 82 for drawing the weights 81 toward each other with the arm 76 therebetween.

A rubber O-ring 84 is provided on bolt 82 between weights 81 and snugly engages in the annular clearance between bolt 82 and hole 83, while a rubber O-ring 85 is interposed between each weight 81 and the adjacent side surface of arm 76 and is centered with respect to bolt 82 by location in an annular groove 86 formed in the inner face of the related weight 81. The rings 86 are snugly gripped between weights 81 and arm 76 by tightening the nut 83 on bolt 82 so that the rubber rings 85 and 86 cooperate to provide a resilient mounting of the assembly of weights 81 and bolt 82 on arm 76 of lever 23a.

When head 30a of contact screw 29a is placed against the lower end surface of connecting body 42a and the latter transmits vertical vibrations to that lower end surface, the head 30a is moved downwardly to the lower limit of the vibrating stroke, thereby to angularly displace lever 23a to an extent corresponding to the amplitude of vibration, and the lever remains in that angularly displaced position, by reason of the inertia of the lever resulting from its relatively massive portion 68 and the weights 81, so that actuating stem 14a of indicator 11a is displaced upwardly to an extent depending upon the ratio of the distances $L_1$ and $L_2$ measured from the pivoting axis of lever 23a to the centers of head 30a and contact piece 24a, respectively. If the distance $L_2$ is twice the distance $L_1$, as in the amplitude indicator illustrated in FIGS. 5 and 6, then the pointer of dial indicator 11a will directly indicate the stroke or total excursion of the vibrating lower end surface of connecting body 42a, that is, twice the amplitude of the vibration. However, it will be understood that the distances $L_1$ and $L_2$ on indicator 10a may be equal to each other, as in the case of the first described embodiment, so that the dial indicator 11a will indicate the amplitude rather than the stroke or total excursion.

It will be apparent that, with the amplitude indicator 10a, the contact screw 29a can be easily replaced, in case of excessive wear resulting from its intermittent contact with the surface which is vibrated. Further, the amplitude indicator 10a can be easily placed upon the table or other workpiece supporting surface 62 of a vibrating machine when the operation of the latter is commenced, thereby to indicate or check the amplitude of the operative vibrations, whereupon the amplitude indicator 10a can be easily removed from the workpiece supporting surface without requiring the loosening or removal of any attaching means.

Although illustrative embodiments of the present invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What is claimed is:

1. A mechanical device for indicating the amplitude of the high frequency vibrations of a surface, comprising mechanical indicating means having a housing and an actuating member projecting from said housing and being movable relative to the latter, a lever mounted for pivotal movement about an axis which is fixed relative to said housing and being engageable with said actuating member to displace the latter in response to pivotal movement of said lever, means on said lever engageable by the vibrated surface so that the lever is pivotally moved in response to the vibrations, and mass defining means on said lever providing the latter with a sufficient inertia to prevent oscillation of the lever in accordance with the vibrations and including damping means effective to prevent the transmission of flexural vibrations along said lever from the vibrated surface to said actuating member, whereby said mechanical indicating means gives a steady indication proportional to the amplitude of the vibration of the surface.

2. A mechanical device for indicating the amplitude of the high frequency vibrations of a surface as in claim 1; wherein said damping means includes at least one weight, and resilient means mounting said weight on said lever.

3. A mechanical device for indicating the amplitude of the high frequency vibrations of a surface, comprising mechanical indicating means having a housing and an actuating member projecting from said housing and being movable relative to the latter to operate said indicating means, a two-armed lever mounted for pivotal movement about an axis which is fixed relative to said housing, one end of said lever being engageable with said actuating member to displace the latter in response to pivotal movement of said lever, the other end of said lever being engageable by the vibrated surface to pivotally displace said lever in response to the movement of the vibrated surface from its at rest position, and mass defining means on said lever substantially balancing the latter about its pivoting axis and providing the lever with sufficient inertia so that said lever remains steadily in an angularly displaced position corresponding to the amplitude of the vibrations of the surface and is intermittently engaged by the latter at the frequency of the vibrations, said mass defining means including damping means operative to prevent the transmission of flexural vibrations along said lever from said other end to said one end of the lever in response to the intermittent engagement of the lever by the vibrated surface.

4. A mechanical device for indicating the amplitude of the high frequency vibrations of a surface as in claim 3; wherein said damping means includes a cylindrical weight extending loosely around the arm of said lever between the pivoting axis of the latter and said one end of the lever, and rubber rings snugly interposed between said cylindrical weight and the related arm of said lever.

5. A mechanical device for indicating the amplitude of the high frequency vibrations of a surface as in claim 3; wherein said damping means includes a pair of weights disposed at opposite sides of the arm of said lever between the pivoting axis and said one end of the lever, said arm of the lever having a hole therein, a bolt extending through said weights and loosely through said hole for drawing said weights toward said opposite sides of said arm, and rubber rings snugly interposed between said bolt and said arm and between said weights and said arm to resiliently mount said weights on said lever.

6. A mechanical device for indicating the amplitude of the high frequency vibrations of a surface as in claim 3; wherein said mechanical indicating means is a dial indicator.

7. A mechanical device for indicating the amplitude of the high frequency vibrations of a surface as in claim 3; wherein said other end of the lever carries a removable contact member for intermittent contact by the vibrated surface and which may be replaced when worn by said intermittent contact.

8. A mechanical device for indicating the amplitude of the high frequency vibrations of a surface as in claim 7; wherein said contact member is adjustable relative to said lever to obtain contact with said surface while the latter is at rest and said indicating means provides a zero indication.

9. A mechanical device for indicating the amplitude of the high frequency vibrations of a surface as in claim 7; wherein said lever further has an adjustable, hardened insert at said one end which is engageable with said actuating member and movable relative to the lever to provide a zero indication on said indicating means when said contact member engages said surface with the latter at rest.

References Cited in the file of this patent

UNITED STATES PATENTS

| | | |
|---|---|---|
| 1,351,663 | Koch | Aug. 31, 1920 |
| 1,390,432 | Douglass | Sept. 13, 1921 |
| 1,702,455 | Trumpler | Feb. 19, 1929 |
| 2,480,891 | Van Winkle | Sept. 6, 1949 |
| 2,602,235 | Dow | July 8, 1952 |